United States Patent
Galliou et al.

(10) Patent No.: US 10,369,560 B2
(45) Date of Patent: Aug. 6, 2019

(54) METHOD FOR LIMITING THE EMISSION OF DUST FROM CATALYST GRAINS

(71) Applicant: EURECAT S.A., La Voulte-sur-Rhone (FR)

(72) Inventors: Pauline Galliou, Saint Laurent du Pape (FR); Pierre Dufresne, Aouste sur Sye (FR); Mathieu Baffert, Guilherand Granges (FR); Giuseppe Italiano, Olivarelle (IT)

(73) Assignee: EURECAT S.A., La Voulte-sur-Rhone (FR)

( * ) Notice: Subject to any disclaimer, the term of this patent is extended or adjusted under 35 U.S.C. 154(b) by 0 days.

(21) Appl. No.: 15/322,102

(22) PCT Filed: Jun. 24, 2015

(86) PCT No.: PCT/EP2015/064288
§ 371 (c)(1),
(2) Date: Dec. 23, 2016

(87) PCT Pub. No.: WO2015/197712
PCT Pub. Date: Dec. 30, 2015

(65) Prior Publication Data
US 2017/0157603 A1 Jun. 8, 2017

(30) Foreign Application Priority Data
Jun. 27, 2014 (FR) ...................................... 14 56017

(51) Int. Cl.
*B01J 33/00* (2006.01)
*B01J 37/02* (2006.01)
*B01J 23/882* (2006.01)
*B01J 37/08* (2006.01)

(52) U.S. Cl.
CPC ......... *B01J 37/0217* (2013.01); *B01J 23/882* (2013.01); *B01J 33/00* (2013.01); *B01J 37/0219* (2013.01); *B01J 37/0225* (2013.01); *B01J 37/08* (2013.01)

(58) Field of Classification Search
CPC .................................................... B01J 37/0217
USPC ........................................................ 427/212
See application file for complete search history.

(56) References Cited

U.S. PATENT DOCUMENTS

| | | | |
|---|---|---|---|
| 2,976,253 A | 3/1961 | Edwards | |
| 4,526,877 A | 7/1985 | Acharya et al. | |
| 5,302,566 A | 4/1994 | Schwartz | |
| 6,294,498 B1 * | 9/2001 | Darcissac | B01J 23/882 |
| | | | 502/159 |

FOREIGN PATENT DOCUMENTS

| | | |
|---|---|---|
| EP | 0897748 | 2/1999 |
| EP | 2000206 | 12/2008 |

* cited by examiner

*Primary Examiner* — Tabatha L Penny
(74) *Attorney, Agent, or Firm* — Hahn Loeser & Parks LLP; Bret A. Hrivnak

(57) ABSTRACT

The present invention relates to a method for limiting the emission of dust from catalyst grains. Said method comprises the following two consecutive steps: a first step of performing a heat treatment of the catalyst grains at a temperature no lower than 100° C., followed by a second step of coating the surface of the catalyst grains by placing same in contact with one or more coating materials having a melting point T no lower than 45° C. and which are injected in a solid state, said second step being carried out with no further addition of heat, at a temperature of T−60° C. to T−1° C., while remaining no lower than 40° C.

20 Claims, No Drawings

METHOD FOR LIMITING THE EMISSION OF DUST FROM CATALYST GRAINS

The present invention relates to a process that aims in particular to limit the dust emitted by catalysts that are in the form of grains during the handling thereof.

The catalysts in question are for example, but nonlimitingly, those used in hydrocarbon treatment processes, in particular in the fields of oil refining, petrochemistry and chemistry, in particular the processes for converting hydrocarbon-based compounds.

The hydrocarbon treatment processes carried out in refineries and/or petrochemical plants include a certain number of treatments essentially intended to modify the structure of the hydrocarbon molecules and/or to eliminate from the hydrocarbon-based cuts undesirable compounds such as in particular sulfur-containing, nitrogen-containing, aromatic and metallic compounds. Mention may be made, as non-limiting examples, of the naphtha reforming, hydrogenation and hydrocracking processes and the processes known as hydrotreatment processes such as hydrodesulfurization, hydrodenitrogenation, hydrodeoxygenation, hydrodearomatization and hydrodemetallization processes.

The catalysts in question may also treat gaseous compounds. Thus, the present invention also applies to all of the catalysts used in the line for the production of hydrogen and ammonia, including the steam reforming step, and also to the catalysts used in the sulfur line (Claus and tail gas catalysts), and all of the oxidation, dehydrogenation and ammoxidation catalysts.

Among the processes capable of using catalysts, some are carried out in the presence of hydrogen, and are usually denoted by the generic term hydroconversion processes.

Most of the processes above require solid catalysts that are in the form of particles also known as "catalyst grains". These catalyst grains comprise a porous support based on one or more refractory inorganic oxides, deposited on which are one or more catalytically active metals, selected from the metals from group VIII of the Periodic Table of the Elements and the metals from group VIB of the Periodic Table of the Elements.

The kinetics of the hydrocarbon treatment reactions are in particular limited by the rate of diffusion of the hydrocarbon molecules (often of large size) toward the catalytic sites located in the pores of the catalyst. Thus, the catalytic sites should be as accessible as possible. This is why the manufacturers endeavored to prepare catalysts having a specific surface area and a porosity that are as high as possible, which results in catalysts in the form of grains of very small size.

However, the size of the catalyst grains should not be too small either, since this leads to an increase in the pressure drop (Delta P) in the hydrocarbon treatment reactor during the operation thereof.

Thus, the manufacturers must cope with two contradictory constraints: the smaller the size of the catalyst grains, the greater the catalytic performance, but the higher the pressure drop in the reactor.

Thus, the catalysts taking part in processes of this type are usually in the form of grains of cylindrical or multilobal shape having a mean diameter ranging generally from 0.8 to 4 mm and a mean length ranging generally from 2.5 to 5 mm. In certain applications, grains of spherical shape are used, the diameter of which varies in general from 1.5 to 5 mm.

An additional constraint that arises in the processes using catalyst grains relates to the mechanical strength of said grains. This is even lower when the porosity and the specific surface area of the catalyst grains are high.

However, the operations for handling the catalysts, especially during the transport thereof and the loading thereof into the reactors, give rise to phenomena of rubbing of the grains with one another or against walls which bring about the formation of "fines", that is to say dust. These rubbing forces also bring about grain attrition phenomena, that is to say a mechanical wear of these grains by rubbing, impact and/or crushing, which results in breakage of the particles and an undesired reduction in the size thereof.

Now, the formation of large amounts of catalyst dust poses several problems. On the one hand, it substantially complicates the loading operations of the grains, insofar as the large volume of dust prevents the progression of the loading from being monitored visually, and it is therefore necessary to stop the loading operations at regular intervals so as to let the dust cloud subside in order to be able to ensure that the catalyst grains are correctly distributed, homogeneously, in the reactor.

Moreover, the formation of such dust poses safety problems, on the one hand for the operators in charge of handling the grains, but also for all the people present on the industrial site. This dust is capable of flying away and being carried in the atmosphere over sometimes quite large distances, causing an additional risk for nearby inhabitants and the surrounding environment.

Specifically, the dust consists of particles having generally broad particle size distributions, that range from millimeter-sized particles to micrometer-sized particles, optionally up to a nanometer size.

The millimeter-sized dust has sizes of less than 1 mm or usually less than 0.8 mm.

Particular attention is given to the next class of micrometer-sized particles as regards the smallest particles, due to their toxicity. They are classified on the basis of their size (cf. for example the EN 12341 and ISO 10473:2000 standards). A distinction is made between:

the particles referred to as $PM_{10}$ (size less than 10 microns), the particles referred to as $PM_{2.5}$ (size less than 2.5 microns), and the particles referred to as $PM_{1.0}$ (size less than 1 micron).

These particles may remain in suspension in the air for durations ranging from one day to one week. Below a size of 2.5 microns, the particles are capable of reaching the pulmonary alveoli by inhalation. Generally, there is a strict control on exposure of populations to the particles $PM_{10}$ and below, for public health reasons.

A more aggravating phenomenon with respect to the HSE (hygiene/safety/environment) aspect is the uncertainty these days linked to the presence of nanoscale materials. The term nanomaterials denotes compounds comprising particles having a size of less than 100 nanometers (i.e. less than 0.1 micron). The subject of the classification of catalysts as nanomaterials is currently being debated at various levels in the European Union. There is no doubt that the catalysts have in essence active phases that are in general dispersed on the nanometer scale, whether these are active phases based on precious metals or based on non-noble metals from groups VI and VIII of the Periodic Table. Moreover, the supports for these catalysts are designed to have porosities of nanometer size, often with pore diameters of between 5 and 50 nanometers.

One aggravating effect for the possible consequences to health is that the catalysts often contain metal elements such as for example cobalt and nickel. These elements are increasingly cited for their toxicity. Thus, the hydrotreatment catalysts for example, which contain cobalt, nickel, molybdenum, tungsten elements, pose an environmental problem due to the generation of dust. More specifically, the hydrotreatment catalysts contain approximately from 2% to 5% by weight of cobalt or nickel oxides; the hydrogenation catalysts may contain from 10% to 50% by weight of nickel.

Beyond the need to limit the emissions of dust for hygiene, safety and environment reasons, there is also an interest as regards the comfort of the working conditions for the personnel in charge of handling these catalysts. These products emit dust which, beyond its possible toxicity, makes its surroundings dirty.

Finally, within the reactors, these phenomena of creating millimeter-sized and micrometer-sized dust have undesirable effects for the correct operation of the reactors: they lead in particular to a significant increase in the pressure drop, which is damaging to the correct passage of the liquid or gaseous fluids through the catalyst bed. The shutdowns of plants for loss of pressure are one of the main causes of untimely shutdown of the reactors in refining/petrochemistry. Therefore, any measure capable of helping to reduce the occurrence of pressure drops is highly valued.

Thus, for all the reasons expanded upon above, it is desirable to reduce as much as possible, or even to completely eliminate, the phenomena of emission of dust from catalyst grains, which is produced generally during the handling and the transport of the catalyst grains, and in particular during the loading of the catalyst grains into the reactors in which they are used industrially.

Solutions have been proposed by the catalyst manufacturers, which essentially aim to increase the mechanical strength of the catalyst grains by various means.

One solution consists in increasing the size of the grains but this is done usually to the detriment of the activity of the catalyst.

Other solutions have been proposed in the prior art in order to increase the mechanical strength of the catalyst grains.

Thus, U.S. Pat. No. 2,976,253 describes a method for avoiding the attrition of the catalysts during the handling thereof, and preventing the pressure drop that results therefrom in the reactors, which consists in coating each catalyst grain with a film of resinous polymer obtained from $C_2$ to $C_8$ monoolefins that is then eliminated during the use of the catalyst. The thickness of the polymer film on the catalyst grains ranges from 25 to 100 µm.

Patent application EP 2 000 206 relates to the protection of catalysts intended for Fischer-Tropsch synthesis, and proposes to strengthen them by adding one or more waxes thereto. The wax used is also present within the pores of the catalyst, and this document does not describe an outer coating of the catalyst particles.

Other documents such as U.S. Pat. Nos. 4,526,877 and 5,302,566 propose to protect the catalyst by means of a permanent coating.

Although the solutions proposed in the prior art for the most part make it possible to reduce the attrition and the formation of dust during the loading of the catalysts, the Applicant has however observed that they generated additional problems.

Specifically, the protective material present as relatively thick layer on the outer surface of the catalyst grains gives rise to two major drawbacks.

The first drawback is that the space occupied by this layer substantially increases the effective diameter of the grain, therefore the volume occupied by each grain. The volume of the reactor to be loaded, which is necessarily limited, is therefore, in the case of a coated catalyst, partially occupied by the protective material, even more so when the thickness of the catalyst layer is large. Since the performance of a catalyst bed is proportional to the amount of active material, it may therefore be significantly reduced if the coating layer is too large, which is not acceptable. Furthermore, during the elimination of the layer, the volume occupied by this layer is freed up. If this occupied volume is large, the catalyst bed will be modified, which is capable of generating preferential pathways for the feedstock circulating through the bed, which is contrary to the requirements of a perfect distribution of the feedstock through the catalyst bed in the reactor, and proves particularly prejudicial for the performance of the plant.

The second drawback is a difficulty in eliminating the layer of protective material during the start-up phase of the plant. This material may be eliminated for example by melting, or by dissolving within the feedstock, and this material is then carried into the circuit downstream of the reactor, the exchange lines, the separators operating at high or low pressure, etc. There is a significant risk of the protective material being deposited at one or more points of the downstream circuit, which may limit the efficiency of the downstream treatment equipment or even risk blocking some of them. The larger the amount of protective material, the greater the risk.

Thus, the Applicant has observed that in the case where the catalyst comprises, in a substantial amount, a protective material intended to be eliminated in the reactor, this gives rise to large deposits of the protective material, more or less decomposed, downstream of the reactor. Thus for example the paraffins and polyethylene waxes used in these techniques are generally not very soluble in the hydrocarbons at relatively low temperature, which leads to undesirable deposits, in particular in the heat exchangers at the outlet of the reactor. Thus for example for a 70 t catalytic bed covered with a protective layer of 3% by weight of wax, the elimination of the protective layer results in having to eliminate of the order of 2 t of wax, which substantially complicates the process.

Finally, additional problems may appear when the protective material is present in the porosity of the catalyst. In this case, the complete elimination of the protective material is even more difficult, which may result in a loss of activity of the catalyst when this material is not completely eliminated from the pores.

The present invention aims to propose an improved method for limiting the emission of dust during the handling of catalysts in the form of grains, while making it possible to solve the drawbacks of the methods from the prior art.

The objective of the invention is therefore not to enhance per se the mechanical strength of the catalyst grains, but to very significantly reduce the formation of dust, and in particular of fine particles, of micrometer size.

The invention applies in particular to catalyst grains that have a satisfactory mechanical strength, in particular a good breaking strength and crushing strength, but which generate fine dust during the handling thereof.

The Applicant has discovered that this objective was achieved by means of a process in which the catalyst grains are, directly following a heat treatment, placed in contact with a solid coating material, under particular temperature conditions.

Thus, one subject of the present invention is a process for limiting the emission of dust from catalyst grains comprising the following two consecutive steps:

a first step consisting in carrying out a heat treatment of the catalyst grains at a temperature greater than or equal to 100° C., followed by a second step that consists in carrying out a coating of the surface of the catalyst grains, by placing these grains in contact with one or more coating materials having a melting point T greater than or equal to 45° C. and which are introduced in the solid state, said second step being carried out without any fresh supply of heat, at a temperature ranging from T−60° C. to T−1° C., while remaining greater than or equal to 40° C.

Thus, the invention consists in carrying out a heat treatment of the catalyst, followed by a step of coating using a material introduced in the solid state, the bringing into contact of the catalyst and of said material taking place at a temperature that is 1° C. to 60° C. lower relative to the melting temperature T of said material.

The second step is carried out without additional supply of heat, the heat needed to carry out the coating being supplied solely by the hot catalyst from the first step.

These conditions enable a coating of the surface of the catalyst grains without the material penetrating into the pores of this catalyst.

The process according to the invention makes it possible to very significantly reduce the formation of dust, especially dust containing micrometer-sized particles, during the handling operations of the catalysts, and in particular during the loading thereof into the reactors of the industrial plants. It makes the handling of these catalysts easier for the operators, and reduces the risks for the latter, and for the surroundings, induced by the presence of particles of very small size.

Moreover, the Applicant discovered that the process according to the invention made it possible to retain a very good efficiency of the plants, without substantial loss of activity resulting from the loading of catalyst grains in coated form.

Specifically, the process according to the invention has proved particularly effective even when using very small amounts of coating materials. It makes it possible to obtain particularly thin coating layers at the surface of the catalyst. This makes it possible to retain a good loading density of the reactors, and to significantly reduce the problems linked to the elimination of large amounts of protective material.

Furthermore, the layer of material according to the invention is eliminated even more rapidly and effectively (for example in contact with the feedstock during the start-up of the plant in which the catalyst is used) when the coating layer is only superficial, and when the coating material has not penetrated into the pores of the catalyst. This enables the feedstock to be treated to rapidly reach all of the active sites of the catalyst.

The term "feedstock" preferably denotes hydrocarbon cuts having, typically, a boiling range at atmospheric pressure within the range extending from 75° C. to 650° C. that may be brought into contact with the catalyst in the liquid or gaseous state. The term "feedstock" may also denote various gaseous compounds such as, by way of nonlimiting examples, oxygen, nitrogen, water, carbon monoxide, methane, ammonia, hydrogen sulfide, sulfur dioxide, etc.

The process according to the present invention may be applied to any solid catalyst in the form of grains, for example, but not limitingly, the catalysts intended for treating hydrocarbon feedstocks, especially in the oil refining and petrochemical fields.

It applies very particularly to hydrocarbon hydroconversion catalysts. These catalysts in the form of grains comprise a porous refractory oxide support deposited on which is at least one metal selected from group VIII metals and group VIB metals.

Preferably, the catalysts contain at least one metal from group VIII of the Periodic Table of the Elements, such as for example cobalt, nickel, iron, palladium, platinum. These metals may be combined with at least one metal from group VIB such as for example molybdenum, tungsten, chromium. The content of group VIII metal or metals is generally between 0.1% and 20% by weight relative to the total weight of the uncoated catalyst, sometimes up to 50%. The content of group VIB metal or metals is generally between 3% and 30% by weight relative the total weight of the catalyst (in uncoated form).

Preferably, the support for the catalysts is selected from amorphous or crystalline aluminas, silicas or silica-aluminas (zeolites). More preferentially, the support contains at least 30% by weight, and better still at least 50% by weight, of alumina.

The process according to the invention is particularly suitable for treating catalysts containing the metallic combinations CoMo, NiMo, NiW or NiCoMo, deposited on alumina-based supports.

These catalysts may contain one or more additives such as organic additives, and halogenated, boron-containing or phosphorus-containing compounds.

These catalysts are in the form of grains of preferentially spherical, cylindrical or multilobal shape.

The invention applies very particularly to catalyst grains, the maximum number-average dimension of which ranges from 1 to 10 mm, preferably from 2 to 5 mm.

The maximum number-average dimension of the catalyst grains may be determined by methods well known to those skilled in the art, and in particular by video particle size analysis, or using a vernier caliper. Use may typically be made of the CAMSIZER video particle sizer developed by RETSCH.

The catalysts used in the invention typically have a specific surface area, measured by the BET method, ranging from 100 to 300 $m^2/g$, a pore volume, determined by nitrogen adsorption, ranging from 0.20 to 1 ml/g, and a mean pore diameter, determined by nitrogen adsorption, ranging from 7 to 20 nm.

The process according to the present invention applies both to new catalysts, that is to say catalysts that have never been used, and to regenerated catalysts, that is to say spent catalysts that have been regenerated in order to strip them of their carbon-based residues (coke) and to restore an activity level to them that enables them to be reused. The regeneration process may in particular be carried out in two steps, a first step of combustion of the coke, and a second step consisting of an impregnation of the catalyst by one or more additives, in particular organic additives, followed by drying. The second step is sometimes referred to as "rejuvenation".

According to one preferred embodiment, the process according to the present invention is carried out continuously.

Preferably, the second step immediately follows the first step, that is to say that the two steps according to the invention are linked together without interruption, in particular with no additional treatment step between these two steps.

It should be noted that an optional conveying (or transport) of the catalyst between the vessels or devices in which the two steps are carried out is not considered to constitute an additional treatment.

Similarly, an optional cooling of the catalyst between the two steps is not considered to constitute an additional treatment. Such a cooling, which may be active or passive (i.e. the temperature of the catalyst is simply left to decrease) may prove necessary when the temperature of the catalyst at the end of the first step is greater than T−1° C., with T being the melting point of the coating material. The cooling may be obtained by the simple fact of conveying the catalyst between the two steps as mentioned above.

In one particularly preferred embodiment, said second step is carried out on an unheated moving bed system, fed continuously by the catalyst directly derived from the first step on the one hand, and by the coating material(s) on the other hand.

The first step of the process according to the invention consists of a heat treatment of the catalyst grains at a temperature greater than or equal to 100° C.

Preferably, this first step is carried out at a temperature ranging from 120° C. to 650° C., more preferentially from 150° C. to 550° C., and better still from 200° C. to 500° C.

The expression "heat treatment" denotes, according to the invention, any treatment of the catalyst consisting in heating this catalyst, or comprising a heating of the catalyst.

Thus, said first step may consist of a simple heating of the catalyst.

The first step may also consist of a drying treatment, or a calcination treatment of the catalyst, carried out for example at the end of the process for manufacturing said catalyst.

This embodiment is particularly advantageous, since it makes it possible to integrate the process according to the invention into a conventional catalyst manufacturing process, the last step of the manufacturing process also being the first step of the process according to the invention. A new catalyst in the protected state is thus directly obtained.

This also makes it possible to advantageously recover the heat supplied during the heat treatment carried out at the end of the preparation of the catalyst, and to use it for the protection of the catalyst.

The first step of the process according to the invention may also consist of a catalyst regeneration treatment, in the case of a spent catalyst.

Indeed, the spent catalysts are generally regenerated by a heat treatment, intended to eliminate the contaminants (heavy hydrocarbons, coke or other impurities) present at the surface and in the pores of the catalyst grains.

In the case where the regeneration comprises a second step (often called rejuvenation), consisting in depositing one or more additives, especially organic additives, within the porosity of the catalyst grains, followed by drying, the first step of the process according to the invention may advantageously correspond to this drying step.

This embodiment is also very advantageous since it makes it possible to integrate the process according to the invention into a conventional catalyst regeneration process, the last step of the regeneration process also being the first step of the process according to the invention. A regenerated catalyst, in the protected state, is thus directly obtained.

This also makes it possible to advantageously recover the heat supplied during the heat treatment carried out for the purposes of the regeneration, and to use it for the protection of the catalyst.

As stated above, the second step of the process according to the invention is carried out by bringing the catalyst grains into contact with one or more coating materials that are introduced in the solid state, unlike most of the processes described in the prior art where the coating of the catalyst takes place by bringing grains into contact with the material in the melt state.

This second step is carried out at a temperature that must meet two criteria.

Firstly, it must be greater than or equal to 40° C. This guarantees that the temperature is high enough to enable an effective coating of the catalyst grains by the coating material(s).

Secondly, it must be within the range extending from T−60° C. to T−1° C., which means that it must be lower (within a range of from 1° C. to 60° C.), than the melting temperature T of the coating material(s). These conditions make it possible to obtain an optimal coating of the surface of the catalyst grains.

Preferably, the second step is carried out at a temperature T ranging from T−50° C. to T−1° C. (temperature lower, within a range of from 1° C. to 50° C., than the melting temperature T of the coating material(s)), more preferentially ranging from T−40° C. to T−5° C. (temperature lower, within a range of from 5° C. to 40° C., than the melting temperature T of the coating material(s)).

Finally, according to the present invention, the second step is carried out without a fresh supply of heat.

This means that there is no heating carried out during this step, the heat necessary for obtaining an adequate temperature being supplied solely by the hot catalyst directly resulting from the first step. Thus, the coating material or materials soften in contact with the hot catalyst resulting from the first step, and thus coat the grains.

The temperature of the second step may thus be controlled by adjusting one and/or other of the following parameters: the temperature of the incoming catalyst (and therefore the temperature at which the first step was carried out), the respective amounts of catalyst and of coating material introduced, and the temperature of the coating material when it is introduced.

As stated above, the coating materials used in the present invention have a melting point greater than or equal to 45° C.

The expression "melting point" denotes the melting temperature at atmospheric pressure of said materials.

In a manner known per se, the melting point of the coating materials may be measured using a differential scanning calorimeter (DSC) such as the calorimeter sold under the name DSC 30 by METTLER, with a temperature rise of 5° C. or 10° C. per minute. The melting point considered is the point corresponding to the temperature of the most endothermic peak of the thermogram.

Preferably, the coating material(s) used has (have) a melting point ranging from 45° C. to 180° C., preferably from 50° C. to 130° C.

Coating materials that are very particularly suitable for the implementation of the process according to the invention are selected from mineral waxes, synthetic waxes, natural waxes, fatty acids that are solid at ambient temperature (23° C.), polymers having a melting point T ranging from 45° C. to 180° C., and mixtures thereof.

The expression "mineral waxes" denotes in particular paraffin waxes such as those derived from the refining of petroleum products.

Among the synthetic waxes, mention may in particular be made of synthetic paraffin waxes such as polyethylene waxes.

The expression "natural waxes" denotes in particular animal waxes and vegetable waxes. Suitable vegetable waxes are for example beeswax and carnauba wax.

Among the fatty acids that are solid at ambient temperature (23° C.), mention may in particular be made of stearic acid and palmitic acid.

The polymers capable of being used preferably have a melting point T ranging from 50° C. to 130° C. They may in particular be selected from polyethylenes and polypropylenes.

It is preferred in particular to use polyethylenes, and especially polyethylene waxes.

According to one preferred embodiment of the invention, the coating material is in the form of particles. These particles have a number-average diameter less than or equal to 200 µm, preferably less than or equal to 150 µm, more preferentially less than or equal to 50 µm, and better still less than or equal to 10 µm.

According to one particularly preferred embodiment, the coating material is in the form of particles of which the number-average diameter is less than or equal to 3% of the number-average diameter of the catalyst grains.

The number-average diameter of the catalyst grains may be determined by methods well known to those skilled in the art, and in particular by video particle size analysis.

The number-average diameter of the particles of coating material may be determined by a laser diffraction particle size analysis method, as defined according to the ISO 13320:2009 standard.

According to the present invention, the total amount of coating material used during the second step may in particular vary from 0.05% to 5% by weight, preferably from 0.1% to 3% by weight, and more preferably still from 0.3% to 1% by weight, relative to the total weight of the coated catalyst.

The total weight of the coated catalyst denotes here the weight of the catalyst ultimately obtained, that is to say covered by the layer of coating material at the end of the second step.

As stated above, the second step consists in carrying out a coating of the catalyst grains, that is to say that it consists in covering the grains, at their surface, with a layer of the coating material(s).

This layer of coating material does not need to be perfectly homogeneous (in particular of identical thickness on all the grains and at the surface of each grain).

It is especially important that it is as thin as possible, and that it remains superficial, that is to say that the coating material does not penetrate into the pores of the catalyst.

Preferably, the second step consists in covering the grains at their surface with a layer of the coating material(s), the mean thickness of which ranges from 0.01 to 15 µm. More preferentially, the mean thickness of the layer of coating material ranges from 0.01 to 10 µm, more preferentially from 0.02 to 5 µm, more preferentially still from 0.05 to 4 µm, and better still from 1 to 3.5 µm.

One of the particularly notable advantages of the process according to the invention is that it enables particularly thin layers of coating material to be obtained at the surface of the catalyst grains.

The mean thickness of the layer of coating material covering the catalyst grains may be determined by scanning electron microscopy.

This thickness may be controlled by adjusting the parameters of the second step, in particular the amount of coating material added relative to the amount of catalyst grains, and also the temperature at which this second step is carried out.

At the end of the second step, the catalyst grains may be dried if necessary, for example in the open air or in the presence of a gaseous stream of air or of any other suitable gas, at moderate temperature so as not to adversely alter the thin coating layer.

The de-protection of the catalyst particles is preferably carried out once the latter have been loaded into the reactor in which they are used.

It is carried out by placing the catalyst under conditions in which the layer of material present at the surface of the particles is eliminated.

Particularly preferably, the coating material(s) is (are) chosen so that it (they) is (are) eliminated spontaneously in contact with the feedstock during the start-up of the reactor in which the catalyst is used. This embodiment makes it possible to carry out, particularly simply and economically, the de-protection of the catalyst at the time of the start-up of the reactor.

The following examples are given purely by way of illustration of the present invention.

EXAMPLES

Methodology Used for the Characterization of the Catalysts

The mechanical strength properties of the catalysts A to H described in the examples below were evaluated according to a test for determining the attrition of the catalyst, which characterizes its impact strength.

This parameter was determined on 50 g samples of catalyst, according to the principle set out in the ASTM D-4058 standard, and which consists in placing a sample of catalyst in a cylindrical drum equipped on its generatrix with a baffle (sheet metal plate welded to the inner wall of the drum), then after closing the drum with the aid of a cover, in rotating the assembly for a duration of 30 minutes, then in measuring the weight loss suffered by the catalyst sample, by screening on a no. 20 (0.85 mm) screen in order to eliminate the fines produced. The weight percentage of fines produced is then calculated.

This test makes it possible to simulate the successive drops of the catalyst particles, which generate breakages and fines.

Moreover, the hydrodesulfurization activity of the catalysts A, B, G and H was determined in a pilot plant.

The feedstock used was a "straight run" gas oil, which has the following characteristics:

| | |
|---|---|
| Sulfur content (ppm by weight) | 11600 |
| Nitrogen content (ppm by weight) | 199 |
| Density (g/mL) | 0.859 |

For each sample, the volume of catalyst used for the test was 10 mL.

Before the actual hydrodesulfurization test, each catalyst sample was activated by sulfurization after a wetting period of 3 hours at ambient temperature by the gas oil, to which 2.5% by weight of sulfur had been added using dimethyl disulfide (DMDS). The sulfurization procedure was carried out with an hourly space velocity (HSV) of 3 $h^{-1}$, an $H_2$/additive-added gas oil ratio of 200 (NL/h)/(L/h) and a total pressure of 3 MPa (30 bar). A first temperature ramp from 20° C. to 250° C. was carried out with a progression of 30° C./h, followed by a hold of 8 h at 250° C. A second temperature ramp from 250° C. to 320° C. was then carried out at 20° C./h, followed by a hold of 5 h at 320° C.

The test feedstock was then injected in order to start the actual test. The test conditions were the following: pressure of 4 MPa (40 bar), H$_2$/gas oil ratio of 300, HSV=2 h$^{-1}$, temperature of 340° C. to 350° C.

The sulfur content of the feedstock was measured at the outlet of the plant by means of a UV fluorescence analyzer. The apparent constants of the desulfurization reaction were calculated according to the formula E1 below:

$$K_v = \left(\frac{1}{\alpha-1}\right)\left(\frac{1}{S^{\alpha-1}} - \frac{1}{S_0^{\alpha-1}}\right) * HSV \quad (E1)$$

with
K$_v$=apparent reaction constant
α=order of the reaction (considered equal to 1.2)
S=sulfur content of the effluents
S$_0$=sulfur content of the feedstock
HSV=hourly space velocity of the liquid feedstock The performance of each sample was evaluated relative to that of a reference catalyst. For this, the relative volume activity (RVA) was calculated according to the following formula E2:

$$RVA = \frac{Kv(sample)}{Kv(reference)} \times 100 \quad (E2)$$

As reference, the K$_v$ value of 100 was attributed to the uncoated catalyst A.

Finally, the formation of dust by the catalysts A to H was determined according to the description of the DIN 55992-1 standard, in the following manner:

The apparatus used consists of a rotary cylinder equipped with a baffle (sheet metal plate welded to the inner wall of the drum) that makes it possible to produce repeated drops and thus generate dust. When the cylinder is rotating, it is swept by a stream of air at a given flow rate, which makes it possible to convey the dust. This air flow passes through a long glass tube that makes it possible to retain only the finest particles, the coarsest particles being deposited at the bottom of the tube. The air flow is then sent through a dust filter in order to collect all the particles in suspension. Unlike the attrition test that measures all particles of less than 0.85 mm, this test makes it possible to quantify only the particles that are harmful by inhalation which are those that remain in suspension in the air for the longest time. Their size is generally less than 10 µm.

In order to quantify the formation of dust, three measurements are carried out at least. One analysis requires 100 g (+/−1 g) of catalyst, which should be weighed accurately to within 10 mg. The dust filter should be weighed to within 1 mg before being installed on the apparatus. The catalyst is then loaded into the cylinder, and the apparatus started up at a speed of rotation of the cylinder of 30 rpm, and an air flow rate of 20 L/min for 5 min. At the end of the measurement, the filter is weighed accurately (+/−1 mg). The difference in mass before and after the measurement directly gives the mass of dust generated for 100 g of catalyst.

The examples below were carried out using a reference catalyst, denoted catalyst A.

Catalyst A is a regenerated commercial hydrotreatment catalyst that contains 20% by weight of MoO$_3$, and 5% by weight of CoO on an alumina support, and which is in the form of cylindrical-shaped extrudates having a number-average diameter of 1.3 mm and a number-average length of 3.2 mm.

Catalyst A has an attrition of 1.8%, a generation of PM10 fine dust of 21 mg/100 g and an RVA activity=100%.

Comparative Example 1: Step 1 Only, Not in Accordance with the Invention

Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment, for 30 min, then the air flow is stopped and the catalyst is left to cool down to ambient temperature. The catalyst thus obtained is denoted catalyst B.

Catalyst B has an attrition of 1.9%, a generation of PM10 fine dust of 22 mg/100 g and an RVA activity=101%.

This example shows that step 1, although needed subsequently for the supply of heat during step 2, has no significant impact per se on the attrition, the dust and the activity of the catalyst.

Comparative Example 2: Step 1+Step 2 at Low Temperature, Not in Accordance with the Invention Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment.

The catalyst bed is then left to cool until it reaches a temperature of 30° C., then 5 g of micronized synthetic wax (having a particle size of 5 µm, sold under the reference MP-620XXF by MicroPowders, melting point 115° C.) were added to the drum. The mixture is homogenized for 30 minutes, then cooled to ambient temperature. Since the mixture still contains fines, these are screened on a no. 20 (0.85 mm) screen and catalyst C, not in accordance with the present invention, is obtained.

The analysis of catalyst C shows that it contains less than 0.1% by weight of carbon which corresponds to less than 0.1% by weight of wax.

By observation with the scanning electron microscope, the grains of catalyst C have no or very little wax at their surface (not measurable).

Catalyst C has an attrition of 1.8% and a generation of PM10 fine dust of 19 mg/100 g.

This example shows that the temperature range claimed in accordance with the invention is important, and that the desired effects are not obtained at 30° C. for a wax with a melting point of 115° C.

Comparative Example 3: Step 1+Step 2 Above the Melting Point, Not in Accordance with the Invention Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment, for 30 min, then the air flow is stopped.

Without waiting for the catalyst bed to cool down, 5 g of micronized synthetic wax (having a particle size of 5 µm, sold under the reference MP-620XXF by MicroPowders, melting point 115° C.) were immediately added to the drum at 140° C. The mixture is thus homogenized for 30 minutes, then cooled to ambient temperature in order to obtain the coated catalyst D, not in accordance with the present invention.

The analysis of catalyst D shows that it contains 0.4% by weight of carbon which corresponds to 0.5% by weight of wax.

The grains of catalyst D, as observed by scanning electron microscopy, are not covered at their surface by a true layer of wax, since this wax is at least partly present in the porosity.

Catalyst D has an attrition of 0.9% and a generation of PM10 fine dust of 9 mg/100 g.

This example itself also shows that the temperature range claimed in accordance with the invention is important, and that the desired effects are not obtained when the second step is carried out at a temperature above the melting point T of the coating material (here at 140° C., for a wax having a melting point of 115° C.).

Example 4: In Accordance with the Invention

Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment.

The catalyst bed is then left to cool until it reaches a temperature of 80° C., then 15 g of synthetic wax (having a particle size of 150 µm on average, melting point 115° C.) were added to the drum. The mixture is homogenized for 60 minutes, then cooled to ambient temperature. Since the mixture still contains fines, these are screened on a no. 20 (0.85 mm) screen and catalyst E, in accordance with the present invention, is obtained.

The analysis of catalyst E shows that it contains 0.3% by weight of carbon which corresponds to 0.4% by weight of wax.

Catalyst E has an attrition of 0.6% and a generation of PM10 fine dust of 4 mg/100 g.

These values are much lower than those obtained for the reference catalyst A, and for the comparative catalysts B, C, D and F.

Comparative Example 5: Step 1+Step 2 Above the Melting Point, Not in Accordance with the Invention Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 190° C., to simulate a drying/activation step or an output from a regeneration treatment, for 30 min, then the air flow is stopped.

Without waiting for the catalyst bed to cool down, 5 g of synthetic wax (having a particle size of 150 µm on average, melting point 115° C.) were immediately added to the drum at 190° C. The mixture is thus homogenized for 30 minutes, then cooled to ambient temperature in order to obtain the coated catalyst F, not in accordance with the present invention.

The analysis of catalyst F shows that it contains 0.4% by weight of carbon which corresponds to 0.5% by weight of wax.

The grains of catalyst F, as observed by scanning electron microscopy, are not covered at their surface by a true layer of wax, since this wax is at least partly present in the porosity.

Catalyst F has an attrition of 1.1% and a generation of PM10 fine dust of 11 mg/100 g.

This example again shows that the use, during the second step, of a temperature above the melting point of the coating material does not make it possible to obtain the desired effects.

Example 6: In Accordance with the Invention

Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment.

The catalyst bed is then left to cool until it reaches a temperature of 80° C., then 20 g of micronized synthetic wax (having a particle size of 5 µm, sold under the reference MP-620XXF by MicroPowders, melting point 115° C.) were added to the drum. The mixture is homogenized for 30 minutes, then cooled to ambient temperature in order to obtain the coated catalyst G, in accordance with the present invention.

The analysis of catalyst G shows that it contains 1.7% by weight of carbon which corresponds to 2% by weight of wax.

The grains of catalyst G are covered with a layer of wax, the mean thickness of which, measured by scanning electron microscopy, is 12 µm on average.

Catalyst G has an attrition of 0.2%, a generation of PM10 fine dust of less than 0.1 mg/100 g and an RVA activity=95%.

This example shows that the desired effects (reduction in the attrition and especially in the generation of dust) are obtained by employing the process according to the invention, with a wax content of 2% by weight.

This amount of wax however induces a slight deficit in the RVA activity, it therefore remains preferable to carry out the invention with a lower content of coating material.

Furthermore, the desired effects in terms of reduction in the attrition and in the generation of fine dust, are achieved particularly satisfactorily. This example illustrates the additional benefits provided by the process according to the invention, by using, in the second step, a coating material in the form of particles of very small size.

Example 7: In Accordance with the Invention

Catalyst A was treated in the following manner:
1 kg of the catalyst is placed in a stainless steel drum having a volume of 3 liters, at a speed of rotation of 4 rpm. A hot air flow is then sent over the catalyst in order to bring its temperature to 140° C., to simulate a drying/activation step or an output from a regeneration treatment.

The catalyst bed is then left to cool until it reaches a temperature of 80° C., then 5 g of micronized synthetic wax (having a particle size of 5 µm, sold under the reference MP-620XXF by MicroPowders, melting point 115° C.) were added to the drum. The mixture is homogenized for 30 minutes, then cooled to ambient temperature in order to obtain the coated catalyst H, in accordance with the present invention.

The analysis of catalyst H shows that it contains 0.4% by weight of carbon which corresponds to 0.5% by weight of wax.

The grains of catalyst H are covered with a thin layer of wax, the mean thickness of which, measured by scanning electron microscopy, is 3 μm on average.

Catalyst H has an attrition of 0.3%, a generation of PM10 fine dust of less than 0.1 mg/100 g and an RVA activity=99%.

In this example, the desired effects, namely a great reduction in the attrition and in the generation of fine dust, while retaining as much as possible a good level of activity, are achieved in a further improved manner. In this regard, the results obtained are, surprisingly, particularly good.

This example illustrates the advantage, on the one hand, of using a coating material in the form of particles of very small size and, on the other hand, of using the smallest possible amount of coating material, so as to obtain the thinnest possible layer.

Surprisingly, despite the very low thickness of its wax layer, catalyst H according to the invention has a low attrition, and generates particularly little fine dust.

The invention claimed is:

1. A process for limiting emission of dust from catalyst grains comprising the following two consecutive steps:
   a first step consisting of carrying out a heat treatment of the catalyst grains at a temperature greater than or equal to 100° C., followed by
   a second step that consists of carrying out a coating of the surface of the catalyst grains thereby forming a coated catalyst, by contacting components consisting of catalyst grains and one or more coating materials having a melting point temperature greater than or equal to 45° C., wherein said one or more coating materials are introduced in a form of a solid at a temperature below the melting point temperature,
   said second step being carried out without any supply of heat other than the heat supplied solely by the catalyst grains from the first step, at a temperature that is 1° C. to 60° C. lower than the melting point temperature of said one or more coating materials, while remaining greater than or equal to 40° C.

2. The process as claimed in claim 1, characterized in that it is carried out continuously.

3. The process of claim 1, characterized in that said second step is carried out on an unheated moving bed, fed continuously by the catalyst grains directly derived from the first step and by the one or more coating materials.

4. The process of claim 1, characterized in that the first step is carried out at a temperature ranging from 120° C. to 650° C.

5. The process of claim 1, characterized in that the first step is selected from a catalyst drying treatment, a catalyst calcination treatment and a catalyst regeneration treatment.

6. The process of claim 1, characterized in that the second step is carried out at a temperature that is 1° C. to 50° C. lower than the melting point temperature of said one or more coating materials.

7. The process of claim 1, characterized in that the melting point temperature of the one or more coating materials used in the second step ranges from 45° C. to 180° C.

8. The process of claim 1, characterized in that the one or more coating materials are selected from mineral waxes, synthetic waxes, natural waxes, fatty acids that are solid at ambient temperature, polymers having a melting point temperature ranging from 45° C. to 180° C., and mixtures thereof.

9. The process of claim 1, characterized in that the one or more coating materials are selected from polymers having a melting point temperature ranging from 50° C. to 130° C.

10. The process of claim 9, characterized in that the coating material is selected from polyethylenes.

11. The process of claim 9, characterized in that the coating material is selected from polyethylene waxes.

12. The process of claim 1, characterized in that the one or more coating materials is in the form of particles, the number-average diameter of which is less than or equal to 3% of the number-average diameter of the catalyst grains.

13. The process of claim 1, characterized in that the total amount of coating material used during the second step ranges from 0.05% to 5% by weight relative to the total weight of the coated catalyst.

14. The process of claim 1, characterized in that the second step consists of covering the catalyst grains at their surface with a layer of the one or more coating materials, a mean thickness of which ranges from 0.01 to 15 μm.

15. The process of claim 14, characterized in that the mean thickness of the layer of the one or more coating materials ranges from 0.01 to 10 μm.

16. The process of claim 1, characterized in that the catalyst grains are a hydrocarbon hydroconversion catalyst, comprising a porous refractory oxide support deposited on which is at least one metal selected from group VIII metals and group VIB metals.

17. The process of claim 16, characterized in that the porous refractory oxide support is selected from amorphous or crystalline aluminas, silicas or silica-aluminas.

18. The process of claim 17, characterized in that the catalyst grains are selected from the catalysts containing the metallic combinations CoMo, NiMo, NiW or NiCoMo, deposited on alumina-based supports.

19. The process of claim 16, characterized in that the catalyst grains are selected from the catalysts containing the metallic combinations CoMo, NiMo, NiW or NiCoMo, deposited on alumina-based supports.

20. The process of claim 1, characterized in that the catalyst grains have a maximum number-average dimension ranging from 1 to 10 mm.

* * * * *